United States Patent
Lafferty

(10) Patent No.: US 12,495,084 B2
(45) Date of Patent: Dec. 9, 2025

(54) REALTIME DISTRIBUTION OF GRANULAR DATA STREAMS ON A NETWORK

(71) Applicants: Matrox Graphics Inc., Dorval (CA); Martin George Lafferty, Auckland (NZ)

(72) Inventor: Martin George Lafferty, Auckland (NZ)

(73) Assignee: Matrox Graphics Inc., Dorval (CA)

( * ) Notice: Subject to any disclaimer, the term of this patent is extended or adjusted under 35 U.S.C. 154(b) by 109 days.

(21) Appl. No.: 17/800,391

(22) PCT Filed: Feb. 24, 2021

(86) PCT No.: PCT/NZ2021/050019
§ 371 (c)(1),
(2) Date: Aug. 17, 2022

(87) PCT Pub. No.: WO2021/173006
PCT Pub. Date: Sep. 2, 2021

(65) Prior Publication Data
US 2023/0079452 A1    Mar. 16, 2023

Related U.S. Application Data

(60) Provisional application No. 62/981,476, filed on Feb. 25, 2020.

(51) Int. Cl.
*H04L 65/65* (2022.01)
*G06F 9/54* (2006.01)

(52) U.S. Cl.
CPC .............. *H04L 65/65* (2022.05); *G06F 9/544* (2013.01); *G06F 2209/548* (2013.01)

(58) Field of Classification Search
CPC ....... H04L 41/042; H04L 65/65; H04L 65/70; H04L 65/80; H04L 67/02; H04L 67/10;
(Continued)

(56) References Cited

U.S. PATENT DOCUMENTS 6,591,355 B2 * 7/2003 Schuster ............... G06F 12/145
                                                                711/E12.066
7,142,509 B1 * 11/2006 Rovner ................. H04L 65/611
                                                                370/428

(Continued)

FOREIGN PATENT DOCUMENTS

EP           2674835 A2    12/2013
WO    WO-2018048585 A1 *   3/2018  ........... G06F 9/5066

OTHER PUBLICATIONS

International Search Report, dated May 19, 2021, for corresponding International Application No. PCT/NZ2021/050019.
(Continued)

*Primary Examiner* — Kevin L Young
*Assistant Examiner* — Jennifer Marie Gutman
(74) *Attorney, Agent, or Firm* — Build IP, LLC; Robert V. Donahoe

(57) ABSTRACT

A system and method for an asynchronous media fabric service. The system includes at least one host configured with the asynchronous media fabric service. The asynchronous media fabric service is configured to: create and delete shared memory pools that are used to allow processes running on a single host direct access to grain data; send and receive grains from other hosts; and serve as an API endpoint for asynchronous media fabric function processes to create, delete and obtain references to streams.

20 Claims, 9 Drawing Sheets

(58) Field of Classification Search
CPC . H04L 67/1097; G06F 9/5016; G06F 9/5022; G06F 9/52; G06F 9/542; G06F 9/544; G06F 12/02; G06F 16/60; G06F 16/70; G06F 2209/523; G06F 2209/548
See application file for complete search history.

(56) References Cited

U.S. PATENT DOCUMENTS

| | | | | |
|---|---|---|---|---|
| 8,108,429 | B2* | 1/2012 | Sim-Tang | G06F 16/125 |
| | | | | 707/648 |
| 8,218,538 | B1 | 7/2012 | Chidambaram et al. | |
| 2002/0099847 | A1* | 7/2002 | Betros | G06F 9/544 |
| | | | | 709/223 |
| 2003/0099254 | A1* | 5/2003 | Richter | H04L 67/1097 |
| | | | | 370/352 |
| 2005/0114621 | A1* | 5/2005 | Lahiri | G06F 12/023 |
| | | | | 711/170 |
| 2005/0262097 | A1 | 11/2005 | Sim-Tang et al. | |
| 2008/0079733 | A1* | 4/2008 | Benson | H04N 19/61 |
| | | | | 345/530 |
| 2008/0114896 | A1* | 5/2008 | Holt | H04L 69/40 |
| | | | | 709/242 |
| 2009/0276820 | A1 | 11/2009 | Amento et al. | |
| 2010/0250863 | A1 | 9/2010 | Arndt et al. | |
| 2012/0182383 | A1 | 7/2012 | Kee | |
| 2014/0317065 | A1* | 10/2014 | Barrus | G06F 12/0253 |
| | | | | 707/688 |
| 2015/0199283 | A1 | 7/2015 | Epstein | |
| 2016/0005439 | A1* | 1/2016 | Stark | H04N 21/242 |
| | | | | 386/201 |
| 2017/0235645 | A1* | 8/2017 | Theimer | G06F 21/6218 |
| | | | | 707/634 |
| 2017/0346721 | A1* | 11/2017 | Bacthu | H04L 49/354 |
| 2019/0042513 | A1 | 2/2019 | Flemming et al. | |
| 2019/0166386 | A1* | 5/2019 | Barnich | H04N 21/235 |
| 2019/0306282 | A1* | 10/2019 | Masputra | G06F 9/544 |
| 2020/0204606 | A1* | 6/2020 | Papalini | H04L 1/0067 |

OTHER PUBLICATIONS

Gusev, Peter et al., "Data-Centric Video for Mixed Reality," 2019 28th International Conference on Computer Communication and Networks (ICCCN), IEEE, Jul. 29, 2019, pp. 1-11, Valencia, Spain.
Yeung, Donald et al, "Multigrain Shared Memory," ACM Transactions on Computer Systems, May 2000, vol. 18, No. 2, pp. 154-196.
Australian Examination Report, dated Aug. 28, 2023, for corresponding Australian Application No. 2021227061.
European Supplementary Search Report and Opinion, dated Dec. 1, 2023, for corresponding European Application No. 21761002.
Wadge Robert, "Media Synchronisation in the IP Studio," Research & Development White Paper WHP 297, BBC, Jul. 2015, British Broadcasting Corporation.
Indian Examination Report, dated Jun. 5, 2025, for corresponding Indian Application No. 202217043734.

\* cited by examiner

REALTIME DISTRIBUTION OF GRANULAR DATA STREAMS ON A NETWORK

1 FIELD OF THE INVENTION

The present disclosure relates to improvements in systems and methods designed to distribute granular data streams within a network where there are real time constraints and a need for multiple (redundant) producers of the same stream and multiple consumers of any stream.

2 BACKGROUND

Television was developed before the advent of the digital computer. Historically, in television stations and production facilities, analogue signals were carried between specialised pieces of signal processing equipment in real time through specialised cables and switches. In the late 1990s the widespread adoption of the SDI (Serial Digital Interface) standard meant that analogue signals could be transmitted as digitised streams, but the essential qualities of the analogue system remained unchanged; SDI signals are carried in real-time on dedicated point-to-point connections through a large crosspoint switcher.

In the late 2000s, the advent of the high-bandwidth PCIe bus in commodity PC hardware meant that it was possible to use generic computers to carry out many of the signal processing functions previously carried out by specialised hardware. This meant that computers could be fitted with SDI interface cards in order to allow asynchronous operations on memory buffers within the computer to process synchronous signals carried in and out of the computer on SDI cables.

Switching capacity for SDI signals is expensive and complex to manage compared to much more widely deployed ethernet networks. With the advent of high-bandwidth ethernet (10 GB and above) methods were developed to allow the transport of uncompressed video in real time over ethernet. This resulted in the SMPTE 2022 and SMPTE 2110 standards, which have seen widespread adoption.

Although SMPTE 2022-6 and SMPTE 2110 allow uncompressed media to be transported over ethernet, they impose tight time constraints on the transmission and reception of the individual ethernet packets that make up a data stream which simulates the timing characteristics of SDI. This is in contrast to the more typical asynchronous data transmission within a generic ethernet environment, where data that need to be transmitted between hosts is packetized according to the needs of the application and transmitted by the network as quickly as possible to the host that requires it, using protocols such as UDP or TCP.

The SMPTE 2022-6 and SMPTE 2110 protocols are well suited for interoperability with SDI, but not appropriate for use in the situation where the processing functions presently carried out asynchronously within a commodity computer need to be executed by multiple hosts in a generic data centre or cloud computing environment.

It will be clearly understood that, if a prior art publication is referred to herein, this reference does not constitute an admission that the publication forms part of the common general knowledge in the art.

3 DEFINITIONS

As used herein, a "granular stream" is a body of data which is divided up into a number of parts (called "grains") which are ordered in an evenly-spaced temporal sequence. An example would be a video stream in which each frame of video is a grain and it must be originated or rendered at a fixed framerate.

A synchronous stream is one that is produced, consumed or processed at a constant rate (in grains/s) in real time as required by a producer, consumer or real-time transmission format such as SDI, S2022-6 or S2110.

An asynchronous stream is one that is produced, consumed or processed at an average rate (in grains/s) that is constant over a relatively long period of time, but where individual grains are processed, in the correct sequence, at any time providing the external real-time requirements of the system are respected.

4 SUMMARY

In one preferred aspect, the present disclosure describes a system including at least one host, each host being configured with an asynchronous media fabric service. The asynchronous media fabric service is configured to: create and delete shared memory pools that are used to allow processes running on the same host direct access to grain data; send and receive grains from other hosts as needed; and serve as an API endpoint for asynchronous media fabric function processes to create, delete and obtain references these memory pools. A system and methodology is suggested that is suitable for running media processing applications in such environments.

It is to be understood that both the foregoing general description and the following detailed description are exemplary and explanatory only and are not restrictive of the invention, as claimed. In the present specification and claims, the word "comprising" and its derivatives including "comprises" and "comprise" include each of the stated integers, but does not exclude the inclusion of one or more further integers.

It will be appreciated that reference herein to "preferred" or "preferably" is intended as exemplary only. The claims as filed and attached with this specification are hereby incorporated by reference into the text of the present description.

The accompanying drawings, which are incorporated in and constitute a part of this specification, illustrate several embodiments of the invention and together with the description, serve to explain the principles of the invention.

5 BRIEF DESCRIPTION OF THE FIGURES

6 DETAILED DESCRIPTION OF A PREFERRED EMBODIMENT OF THE INVENTION

Figure 1:
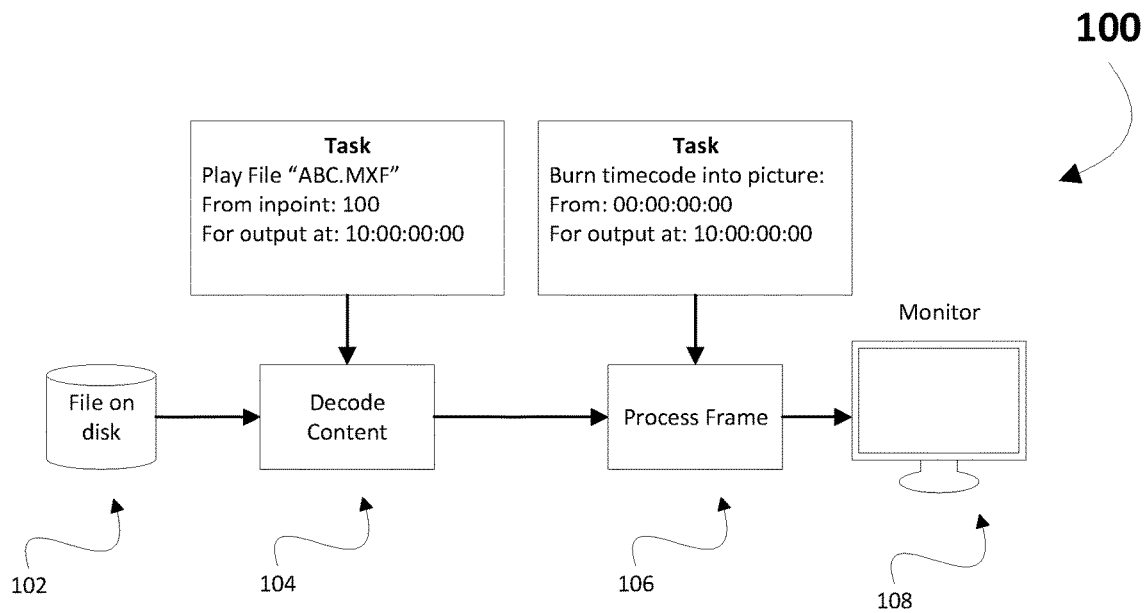
FIGS. 1 and 2 show a flow of media content with associated tasks in accordance with a preferred embodiment of the disclosure.

Reference will now be made in detail to the present preferred embodiments of the invention, examples of which are illustrated in the accompanying drawings.

6.1 Asynchronous Media Fabric

The Asynchronous Media Fabric (hereinafter "AMF") is a software framework intended to host specialised media-processing functional processes and allow them to capture, process, and output content without imposing unnecessary timing constraints.

In addition to hosting media-processing functional processes the AMF framework provides an API to allow these functional processes to be controlled in a co-ordinated way in accordance with the needs of a supervisory software system. This supervisory software system is the "AMF Application".

With AMF functional processes, real time constraints need to be respected wherever synchronous streams are consumed or generated, but most streams transferring content between processing modules within a system may be asynchronous, which allows computing and communication resources to be more efficiently allocated. This mode of operation more closely matches generic computing workloads than a strictly synchronous approach, in which frames are identified by their time of transmission rather than their content.

In a traditional equipment room, based on synchronous transfer of content, specialised hardware devices providing processing functions are connected together with an SDI switcher and associated cabling or a high bandwidth ethernet network across which content is transferred using S2022-6 or S2110.

- In an AMF system, processing functions are provided by AMF function processes and all content transfer is asynchronous apart from at IO ports where the AMF system interfaces with a traditional synchronous system.
- In an AMF system, a supervisory software system, the AMF Application, controls the operation of processing functions by sending AMF control streams to the AMF system.

Reference will now be made in detail to the present preferred embodiments of the invention, examples of which are illustrated in the accompanying drawings.

6.1.1 Fully Asynchronous Applications

There are many applications in which media streams are processed asynchronously and there is no real time capture or render of those streams. One example is a transcoding application in which media content encoded in a file has some transformative function applied to each frame, then the modified frames are rewritten to a new file. An application like this has no real time capture or presentation of content and the entire process can proceed asynchronously. The amount of time taken to process each frame will be entirely dependent on how much computing resource is available to execute the task and the framerate is not regulated to any fixed framerate.

6.1.2 Real Time Constraints

Entirely asynchronous processes are an interesting class of application, but the Asynchronous Media Fabric described herein is not designed for this type of application. The AMF controls stream flows where at least one of a chain of processes is regulated to real time. This may be captured from a real time stream, or delivery to a real time stream or both. The design allows processes to run asynchronously to the greatest extent possible given the constraints of real time input or output. Consider the simple asynchronous application described above, modified as an application 100 in FIG. 1 so as the output is delivered to a monitor, rather than a disk file.

In this case, as shown in FIG. 1, the monitor [108] is a real-time output device: the stream is delivered to this device at a fixed framerate. In addition to this, in the general case, there will almost always be an absolute time constraint, which means that each specific frame from the input file [102] is delivered to the monitor at a specific time—since this process may be a part of a greater application in which synchronisation of multiple outputs is important.

In the case of an entirely asynchronous process, the process starts transcoding the file as soon as possible, and completes the task as quickly as possible. There is no consideration of real time. As soon as a real-time constraint is added, then the average framerate through each processing node is locked to the output framerate. This does not mean, however, that each process needs to run synchronously. In the example in FIG. 1, frames are read from the disk, decoded [104], and processed [106] and stored in a memory buffer before they are required for presentation, and each of these processes are preferably asynchronous. In an entirely asynchronous system, each process may take as long as is required to complete its task. In a system with real-time constraints, this is not the case—each process must be able to maintain an average framerate equal to the output framerate. This does not mean, however, that every frame must be processed within 1/framerate seconds—frames are preferably buffered prior to output to allow for a degree of asynchronous processing upstream of the output.

6.1.3 Buffering and Preroll

The larger the amount of buffering in the system, the greater is the permissible variation between the time needed to process each frame. One obvious constraint on how much buffering is possible is the amount of memory available for this purpose, but there is another, less obvious, constraint that is more important in many practical situations. This is the responsiveness of the system to control inputs, and it is particularly relevant in situations dealing with live streams.

In the example in FIG. 1, the decoder process [104] and the frame processor [106] need an instruction to carry out a specific task to do, and that task will be related to a specific output time.

Referring to FIG. 1, once a frame has been processed and committed to an output buffer, editing the task associated with that frame has no effect on its content. If the number of frames buffered by the output is large, then any changes to the task have no effect on the output until all the buffered frames have been consumed. This means that in order to be responsive to control inputs, the number of pre-buffered frames should be minimised.

In the AMF, the number of buffered output frames is called the "preroll" of the system. Choosing the correct preroll will depend on the application. For a highly responsive system, in which the output responds rapidly to control inputs, the preroll should be minimised. For systems in which responsiveness is not as important, greater margin for asynchronous processing is permitted by having a larger preroll. This allows for more efficient use of hardware resources.

6.1.4 Live Capture

There may be more than one real-time constraint within a system. In the case of live capture, the identity of a frame is established by the actual time the frame is read by capture hardware. In order that a frame from a live source may contribute to output, it needs to be captured some time before the output frame is required; this allows some asynchronous processing to occur before the frame is rendered to output.

Figure 2:
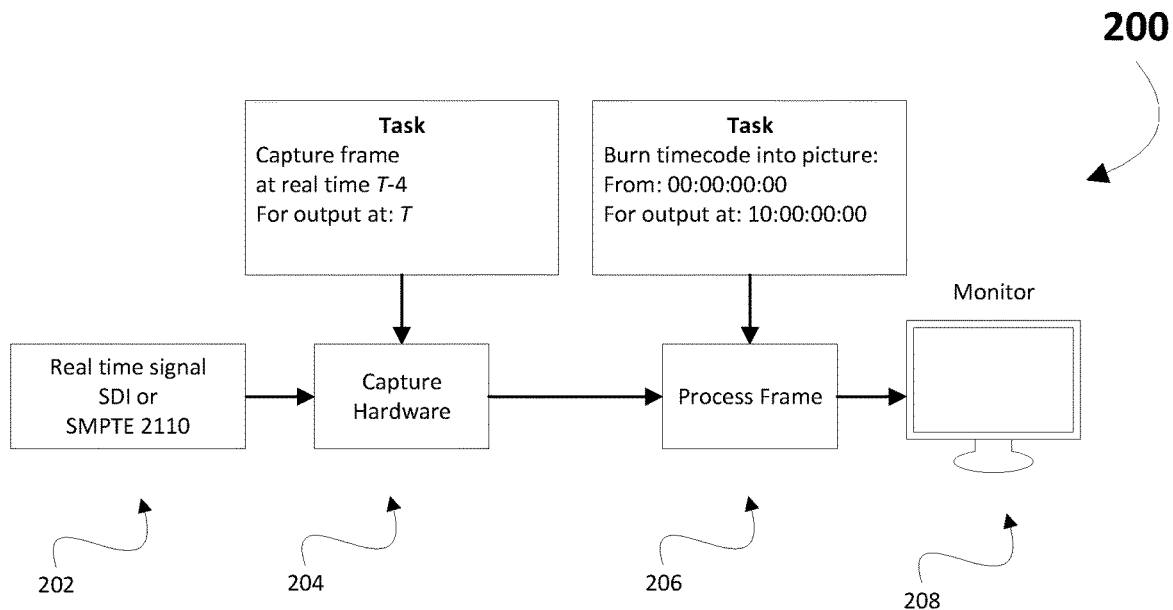

Consider the simple example described above in which the file decoder is replaced by live capture, as shown as an application 200 in FIG. 2. In this case, the frame that is to be output at time T is captured at T-4 [204]. The frame cannot be processed until it is captured, therefore the time available for asynchronous processing of the frame with nominal timestamp of T is 4 frames. For a system with real time capture and real time output the time difference between a frame being captured and the frame to which it contributes being output is called the latency of the system. In the example above, the latency is 4.

6.1.5 Timing in the Asynchronous Media Fabric

Figure 3:
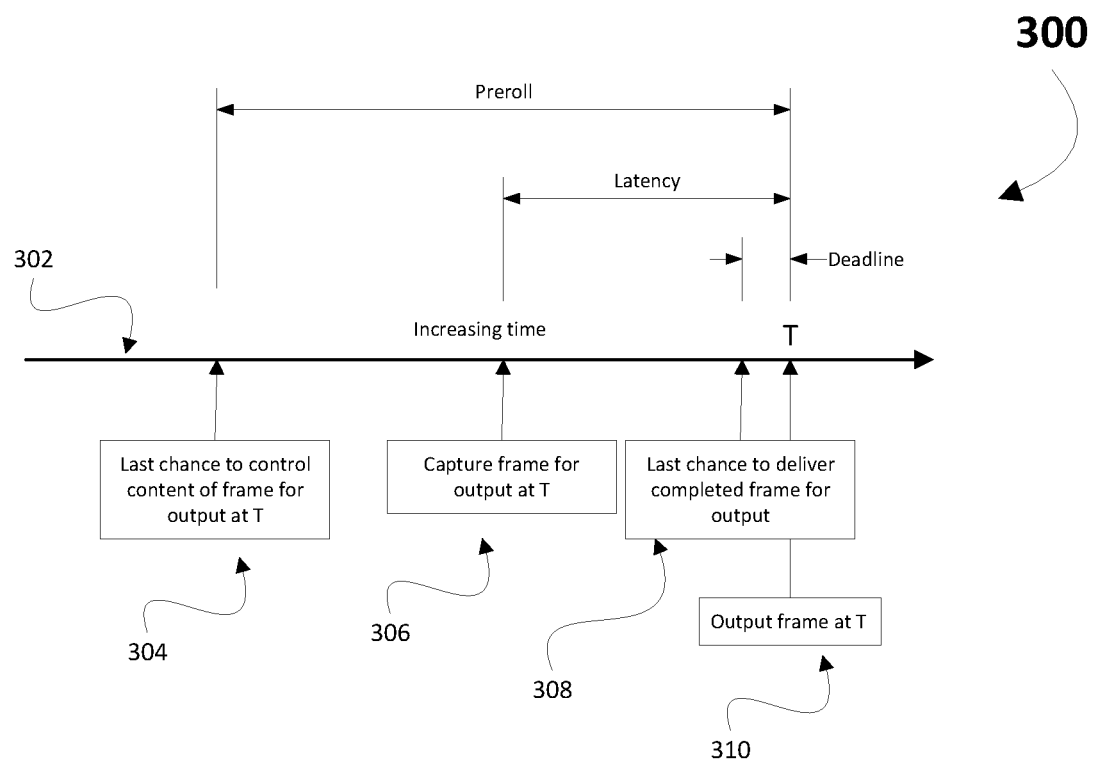
FIG. 3 illustrates the timing of actions associated with the processing of a data grain in the asynchronous media fabric in accordance with a preferred embodiment of the disclosure.

Timing in the Asynchronous Media Fabric may be summarised as shown in FIG. 3. This figure shows events happening to a specific frame shown on a timeline [302]. The frame is identified by its output time, T. Within the Asynchronous Media Fabric, real time constraints for a frame that needs to prepared for output at T are as follows:

In order that the system is responsive to control inputs, frames cannot be prepared for output earlier than T−preroll [304].

Frames that are dependent on live captured frames cannot be prepared for output [310] earlier than T−latency [306].

A frame that must be output at time T [310] is presented to the output hardware some time before T. This is the output deadline [308].

Preroll and deadline are configuration variables. Latency is a property of a specific route through the system from a real time input to a real time output, and depends on the configuration of the input and the output.

FIG. 3 is an example of how a system 300 is timed. Although, in this example, capture [306] occurs after preroll [302], there is no requirement that this need be done. In some applications it may be appropriate for capture to occur before preroll.

6.1.6 Control Streams

In a system where independent media processing functions run asynchronously, the tasks performed by these processes, as defined by a supervising application, still need to be synchronised with the stream content. In the AMF, functions that generate, manipulate or consume streams are controlled by parameters that have their values defined over an interval. Function control input parameters defined in this way are called "control streams". Control streams are defined using the same time-base as media streams so that they can be synchronised with media content to ensure that functions can execute their intended task frame-accurately, consistent with the overall objectives of the supervising application.

Control streams are a natural extension of the more well-known stream types of video, audio and metadata.

6.2 Elements of the Asynchronous Media Fabric

6.2.1 System

In a preferred aspect, a system is a set of computers or virtual machines running AMF services and connected by a network or networks. The computers or virtual machines are referred to as "hosts" in the remainder of the present disclosure.

6.2.2 Stream

A stream is granular and includes a sequence of grains. Each stream is identified with a name that is unique within the system, and each grain within the stream has a nominal timestamp. The content of the grain is uniquely identified by the name of the stream and its nominal timestamp within the stream. Grains may be duplicated within the system, however any grains with the same stream name and nominal timestamp will contain the same content.

6.2.2.1 Stream Format Descriptor

Each stream has an associated format descriptor which provides sufficient information for the data within the grain to be interpreted in a meaningful way.

6.2.2.2 Stream Name

Two streams with the same name have the same format descriptor. A reference implementation exists in which the format is encoded into the name using a unique hashing algorithm, however any other means of enforcing this requirement, as might be familiar to a person skilled in the art, may be employed.

6.2.2.3 Stream Framerate

The framerate of the stream is the average rate at which grains within the stream are processed in grains per second. This framerate is constant for all streams within a system and is called the "system framerate".

6.2.3 Messages

Hosts send messages to each other using a generic messaging protocol. A reference implementation exists using User Datagram Protocol (UDP) over ethernet, however any other messaging protocol, as might be familiar to a person skilled in the art, may be used if the protocol provides for prompt delivery of messages between hosts. Messages may be directed at a specific host (targeted message) or at all hosts (broadcast message) or a set of hosts (multicast message).

6.2.4 Grain Transfer

Grains can be copied from one Host to another using a high bandwidth, low latency data transfer mechanism. This may be the same mechanism used for messages, but this is not a requirement, and such an arrangement is likely to be sub-optimal. Streams may have very high bandwidth requirements and the grain transfer mechanism is preferably configured to accommodate this. Although it is not a requirement of the system, a grain transfer mechanism allowing simultaneous transmission of data from a single source host to multiple target hosts creates opportunities for optimising the use of network resources. A reference implementation exists using remote direct memory access (RDMA), however any other transfer mechanism, as might be familiar to a person skilled in the art, may be used if the mechanism provides sufficiently high bandwidth and low latency as determined by the requirements of the AMF system as described herein.

6.2.5 Time Synchronisation

For a system with more than one host, all hosts within that system have access to reference time synchronised to within an order of magnitude less than 1/system framerate. A reference implementation exists using Precision Time Protocol, as defined by IEEE 1588, to achieve this. However, any other clock synchronisation mechanism, as might be familiar to a person skilled in the art, may be used to provide the mechanism allowing the hosts to have their clocks synchronised sufficiently accurately to meet the requirements of the AMF system as described herein.

6.2.6 Synchronous Input and Output

Within the system, there may be streams that are associated with real-time SDI, S2022-6 or S2110 data that are accessible to the system via IO ports. IO ports use hardware having hard real-time capabilities for this purpose. Realtime input hardware delivers grains to the system having a nominal timestamp encoding the real time at which the grain was captured from SDI or a real-time ethernet protocol. Similarly, output hardware receives grains from the system that contain the required output time encoded in the nominal timestamp—these grains are buffered by the hardware and delivered to the SDI, S2022-6 or S2110 connection at the correct time.

6.2.7 Relationship between grain nominal timestamp and IO timestamp

In any practical system that incorporates real time IO, the grain nominal timestamp has a fixed offset relationship with the real time at which the grain is captured from an input port or delivered to an output port. A reference implementation exists using the SMPTE 2059 standard to determine the relationship between IO timestamp and nominal timestamp, however any other such relationship, as might be familiar to a person skilled in the art, may be used, provided it is consistently applied throughout the system.

For real time outputs or displays, the nominal timestamp aligns with the grain presentation time by a fixed offset, which in many cases is zero. Particular applications may require multiple real time outputs. The offset between nominal timestamp and presentation time is not necessarily the same on all output ports or displays; this depends on the needs of the application.

Similarly, for real time inputs, the nominal timestamp of any grain obtained by live capture will align with the grain capture time by a fixed offset. In a system with multiple capture ports, the offset between nominal timestamp and capture time is not necessarily the same on all ports. On a specific signal path, the output offset and input offset ought to allow a positive latency, as described in section 6.1.5 above.

6.2.8 AMF Service

The AMF service is a service application that runs on every host in the system. There is single AMF service per host. The AMF service has the following responsibilities:

Creating and deleting shared memory pools that are used to transfer grains between function processes applications running on the same host.

Sending and receiving grains from other hosts as required.

Serving as an API endpoint for AMF function processes to create, delete and obtain references to streams.

Serving as an API endpoint for other software to control AMF function processes by creating and editing control streams.

6.2.9 Clock Service

The clock service is a service application that runs on every host in the system. There is single clock service per host. The clock service and the AMF service may be provided by the same process, but this is not a requirement. The clock service is responsible for generating a clock trigger that causes the ClockTick and ProcessFrame functions to run in AMF function processes.

6.2.10 AMF Function Processes

A purpose of the AMF system is to host media processing functions. An AMF function is a process running on a host machine. A reference implementation exists that manages the lifetime of AMF functions by running system configuration scripts, however any process orchestration system, as might be familiar to a person skilled in the art, for example Kubernetes, might be used to manage the lifetime of AMF processes in accordance with the needs of the supervising application.

6.2.10.1 AMF Function Control Streams

An AMF function process is instantiated to generate, consume or modify grains which are obtained from the network, delivered to the network or generated internally within the function. Each function has a specific purpose and the detailed information required to process a frame or set of frames with a specific nominal timestamp is provided by the AMF application, as defined in section 6.1 above, as a control stream, as defined in section 6.1.6 above.

A control stream is presented to the function process as a structured parameter defined as a function of T, f(T) over an interval $t0<=T<t1$, where the argument T is the grain nominal timestamp. The precise structure of the timeline parameter will depend on what the function is designed to do. Some examples of a function input parameter defined by a control stream include:

A media filename in the case of a function process that is intended to play media files.

One or more input stream names in the case of a function process that is intended to compose a number of streams together.

Function control streams are the application programming interface between the media processing application that is using the AMF system and the function processes that are hosted by the AMF system to provide specific services. It is important that the control inputs to function processes are defined over an interval rather than by immediate update, because the asynchronous nature of function process execution means that it is not possible to predict exactly when any specific grain might be processed by the function, yet the grains need to be processed correctly with respect to the nominal timestamp. This would not be possible if the control input to the function was in the form of immediate real-time updates.

Since the timebase upon which control streams are based is the same as that used by media streams, control streams can be easily synchronised with the media stream upon which they operate.

6.2.10.2 AMF Function Process Clock Callbacks

AMF function processes contain two entry points, ClockTick and ProcessFrame that are called in response to a clock trigger event generated locally by each host.

6.2.10.2.1 ClockTick(T: Timestamp)

This entry point is called at the system framerate. The "current time", converted to a grain nominal timestamp, is passed as a parameter to this call whenever it executes. The ClockTick function executes as soon as possible after the passing of the time indicated by the timestamp parameter. The system does not guarantee any minimum time elapsed between the actual time indicated by the Timestamp parameter and the execution of the function, except that it should be as small as operational conditions allow.

6.2.10.2.2 ProcessFrame(T: Timestamp)

This entry point is called at the system framerate. A grain nominal timestamp is passed as a parameter to this call, indicating that the AMF function process should process the grain or grains identified by this timestamp and as specified by its current control stream. The parameter T is passed to the function control stream to obtain the value of the control parameters required to process the specific output grain or grains identified by the timestamp. Having created the grain content specified by its control stream for a specific value of T, this content is delivered to an output stream or streams.

If the system needs the grain with the nominal timestamp T to be output at real-time of t, then ProcessFrame will not be called earlier than (t−preroll) and not later than (t−deadline), where preroll and deadline are properties of the system, as described in section 6.1.5 above.

6.2.11 Grain Pools

A grain pool is a block of memory that is shared between AMF function processes running on a host. The grain pool is the mechanism by which an AMF function process accesses a named stream. For each stream present on a host, there is a single pool. This is stored in shared memory, in order that it may be accessed by multiple function processes simultaneously.

6.2.11.1 Pool References

An AMF function process requests access to a stream by requesting a read only reference or a read/write reference to a pool, by name, from the AMF service. The AMF service creates the pool if it does not exist, then returns a reference to the newly created pool. If the pool already exists, the service returns a direct reference to the existing pool. This ensures that there is only a single instance of a pool on each host.

In order to obtain write access to grain data within a pool, an AMF function process requests a read/write reference to the pool. An AMF function cannot obtain write access to grain data within the pool using a read only reference to the pool.

6.2.11.2 Read Only Pools

A read/only pool is a pool to which only read/only references have been requested. A pool in this state can only receive grain data from a remote host. A read/only pool becomes a read/write pool when any AMF function process successfully requests a read/write reference to the pool.

6.2.11.3 Read Write Pools

A read/write pool is a pool to which at least one read/write reference has been granted. A pool in this state can receive grain data from an AMF process running on the local host or from a remote host. A read/write pool becomes a read only pool if all read/write references to the pool are closed and at least one read only reference remains.

6.2.12 Overview of the AMF System Components

Figure 4:
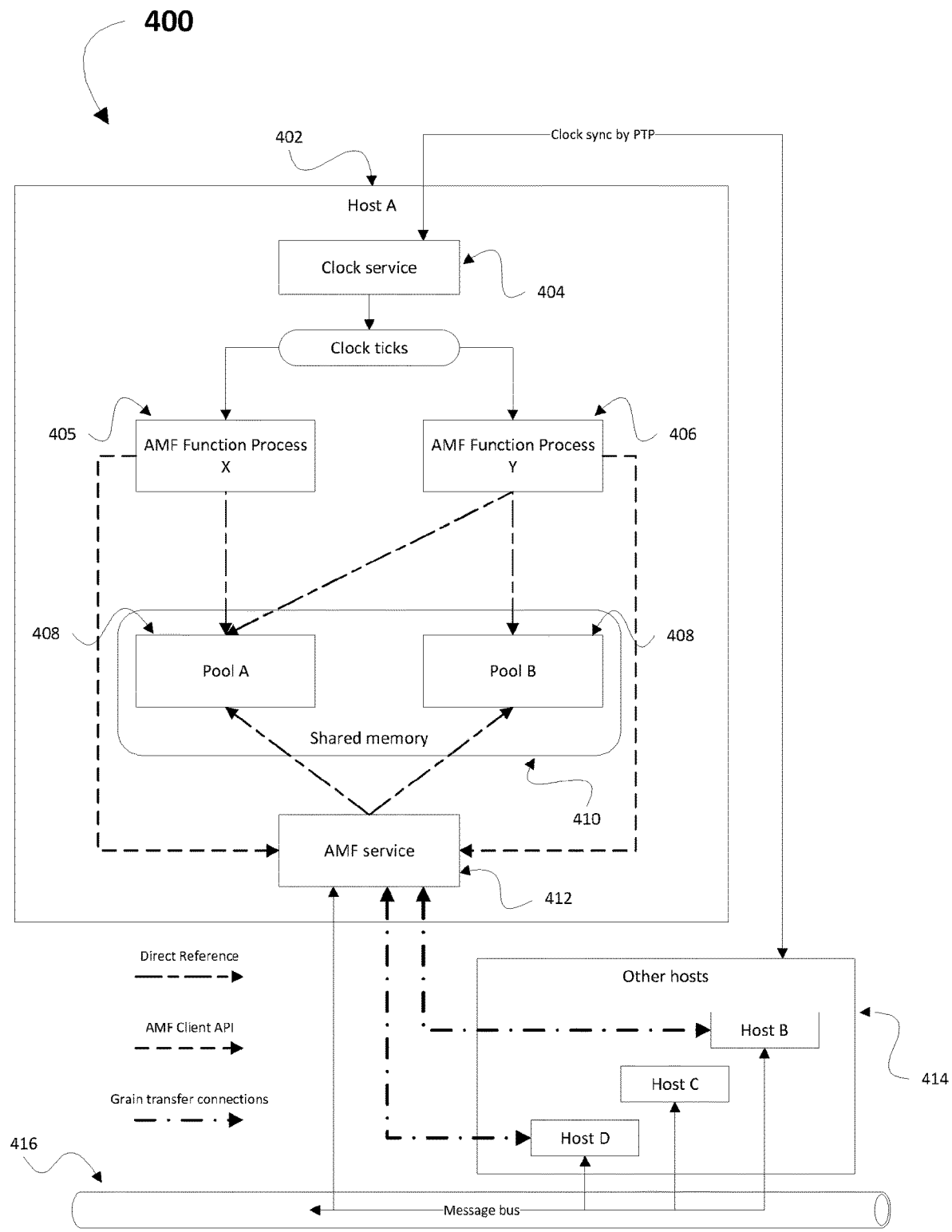
FIG. 4 is a diagram of system components in accordance with a preferred embodiment of the disclosure.

The functional elements of an AMF system [400] are shown in FIG. 4.

A system [400] includes a number of hosts.

On each host [402] there is a single AMF Service [412], which allocates and deletes grain pools [408] in shared memory [410] as required by AMF function processes, for example, function process X [405] and function process Y [406].

There are multiple grain pools [408], each with a unique name, on a host [402]. Function processes [405, 406] request references to pools [408], by name, from the AMF Service [412]. References to pools [408] held by function processes [405, 406] are pointers to shared memory [410]. Multiple copies of the same pool may be included within the system, but they will be on different hosts. The lifetime of pools is controlled by reference-counting.

Each host [402] has a clock service [404]. This generates calls to the ClockTick and ProcessFrame entry points within each AMF function process [405, 406]. Grains are read from pools and written to pools within these calls in accordance with the objective of the function process and as defined by the function control stream, which is supplied by the controlling AMF application.

The clocks on each host are synchronised using a time synchronisation protocol such as PTP, or any other synchronisation mechanism with sufficient accuracy.

The AMF service [412] on a host may communicate with AMF Services on other hosts within the system using a message bus [416]. Messages may be directed to all hosts (broadcast) or a single host (directed).

If multiple copies of a pool exist within the system, then all those copies are (as defined above) on different hosts [414]. The AMF service on each system maintains a network of high bandwidth bi-directional "grain transfer" links so that each pool has a connection to all other pools within the system having the same name.

6.3 Single Host Operation of the AMF System

In order to understand the operation of AMF across multiple hosts, it is useful to have an understanding of how the system operates on a single host, as multiple host operation is an extension of the single host case.

Each AMF function process preferably operates in isolation from other AMF function processes. A function that is attempting to read a stream assumes that data for its input streams will be provided by other function processes, but has no control or interest in the identity or location of that provider: either the data the function is attempting to collect is present, or it is not.

6.3.1 Function Process Open Pool

In order to read or write to a stream, the function process makes a request of its local AMF service to return a reference to the pool that will contain the stream data. When requesting a reference to a pool, the function process passes a buffer format: this is a structure describing the format of the grains within the pool.

When the AMF Service receives the request, it checks to see if the pool with the correct name and format exists. If it does not exist the AMF service creates a new pool using the name and format passed by the function process.

In the event that a new pool is created, or a matching pool is found, the AMF service returns information that allows the function process to map a pointer to the pool into its address space. The AMF service adds a reference count to the pool.

An AMF function process may request a pool reference to be read only or read/write. A read only pool reference can only be used to obtain read access to grains within the pool. A read/write pool reference can be used to obtain read access and write access to grains within the pool.

6.3.2 Function Process Close Pool

When the function process has finished with the pool it sends a notification to the AMF Service, which decreases the reference count on the pool. If the reference count reaches zero, the resources associated with this pool are released.

6.3.3 Grain Pool Implementation

Figure 5:
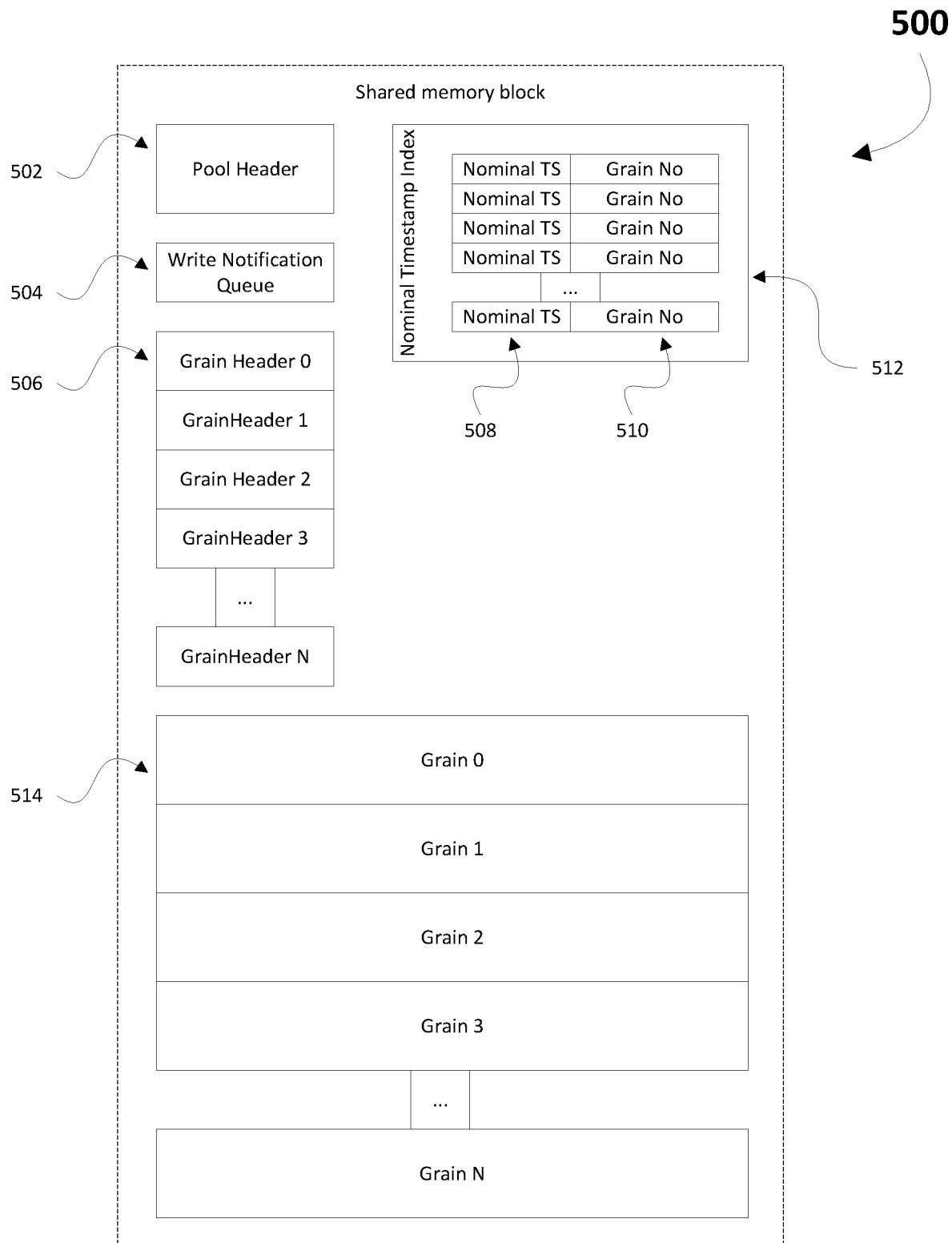
FIG. 5 is a diagram of the layout of a memory pool in accordance with a preferred embodiment of the disclosure.

Referring to FIG. 5, the grain pool is implemented as a block of shared memory with associated client-side and server-side libraries for managing the data within the pool.

6.3.3.1 Pool Size

A grain pool is a fixed size block. The number of grains within each block is determined by the configuration of the system and is greater than the system preroll, as the minimum number of grains that are required in each pool will be the number of grains processed at the system framerate from the time a grain is prepared (the "preroll time") and the time the grain is consumed, which could be as late as the real time output time for the system. In practice, a safe pool size will be somewhat larger than this.

6.3.3.2 Pool Header [502]

Referring to FIG. 5, this block contains:
- The name of the pool
- Pool total reference count
- Pool read/write reference count
- System mutex for locking the pool under some circumstances
- The grain format record
- Some data for managing the pool index
- A control block for the write notification queue

6.3.3.3 Write Notification Queue [504]

The write notification queue has one entry for each grain in the pool. This queue is used, in conjunction with the associated control block stored in the pool header, to generate a notification in the AMF Service whenever grain data is successfully written to the pool by an AMF function process. The write notification queue is used to implement remote writes and its operation is described in more detail in section 6.4.2 below.

6.3.3.4 Grain Headers [506]

For each grain in the pool there is a header containing management information. The grain header contains:
- The write complete event. This is a system event that is signalled when a write lock that has been granted for this grain is released.
- A system mutex.
- The nominal timestamp presently associated with the grain.
- The grain reference count. This is the total number of read locks and write locks that have been granted for this grain.
- An error code. This is set by function processes that are unable to complete a write to the grain after having obtained a write lock, and indicates that the grain data is invalid.

6.3.3.5 Nominal Timestamp Index [512]

When a grain is assigned a nominal timestamp [508], a corresponding entry is made in this index, which is sorted by nominal timestamp. This allows function processes to efficiently locate grains by nominal timestamp using a binary search and to iterate over grains in nominal timestamp order.

6.3.4 Function Process Obtain Write Lock

If a function process wants to write data to a grain it requests a write lock on a grain from within a pool to which it has already obtained a read/write reference. The function process does not need to refer to the AMF Service to do this—it can access the pool directly through a pointer to the shared memory block within which the pool is stored.

The function process identifies the grain to which it wants to write using the timestamp passed via the ProcessFrame or ClockTick callbacks. This timestamp is numerically equivalent to the grain's nominal timestamp.

The function process searches the pool's nominal timestamp index to see if the pool already contains a grain with the required nominal timestamp. If the nominal timestamp is found in the index, then the associated grain header is checked to see if a write lock has already been granted, in which case a second write lock cannot be granted; the calling function process is informed that it is attempting a redundant write. This means that another function process has already provided the data for the grain with this pool name and nominal timestamp. This is not necessarily an error condition—it is a mechanism that enables the AMF system to allow multiple redundant providers for a stream.

If the grain is present in the pool, but has not yet been assigned to a write lock, the lock is granted and a reference count is added to the grain.

If the requested nominal timestamp is not present in the index, then the nominal timestamp is assigned to an existing grain using the "grain recycling" mechanism described in section 6.3.5 below. A write lock is granted, and the reference count incremented, on a newly recycled grain.

If the function process successfully obtains a write lock, it will either write data to the grain, or write an error code to the header. Once completed, it will release the write lock—this will signal the "write complete" kernel event associated with the grain. This in turn will release any threads waiting to obtain a read lock on the grain.

6.3.5 Grain Recycling

If a grain is not present in the pool with the requested nominal timestamp, then the requested nominal timestamp is assigned to the grain that has the lowest nominal timestamp of all the grains present in the pool that have a reference count of zero. This grain is called the "oldest unreferenced grain". Any grain that has not been used since the pool was allocated (and hence does not appear in the nominal timestamp index) may also be returned as the "oldest unreferenced grain".

This is an important feature of the AMF grain processing mechanism: a grain is not released when its reference count drops to zero—the data associated with a specific nominal timestamp is held in the pool for as long as possible and can be resurrected with a read lock request at any time after it has been populated with data and before it is recycled.

It is possible for Grain recycling to fail if there are no grains available with a reference count of zero. This is a serious error condition caused by function processes failing to release locks in a timely fashion, or the size of the pool being too small to account for system conditions.

6.3.6 Function Process Obtain Read Lock

If a function process wants to read data from a grain, it will request a read lock on a grain from within a pool to which it has already obtained a read/write or a read only reference. The function process does not need to refer to the AMF Service to do this—it can access the pool directly through a pointer to the shared memory block within which the pool is stored.

The function process identifies the grain from which it wants to read using the timestamp passed via the ProcessFrame or ClockTick callbacks. This timestamp is numerically equivalent to the grain's nominal timestamp.

A read lock cannot be granted until a write lock has been granted and then released indicating that either the required data is available within the grain, or an error has occurred.

For this reason, when requesting a read lock, the function process provides a timeout value. The request for a read lock will block until the required data is available (indicated by the grain's write complete event being signalled) or a timeout occurs.

Once a read lock has been granted a reference count is added to the grain. This prevents the grain being recycled until the lock has been released. The function process may hold the lock for as long as is required to meet the needs of the function process, providing that pool has sufficient capacity to accommodate real-time buffering requirements as well as additional grains to allow for function processes to hold them for a little extra time as and when required.

6.3.7 Grain Lifetime

In an AMF system, function processes are not necessarily aware of each another, except that a function process waiting on a read lock is dependent on another process writing to the grain before the lock may be granted. Similarly, a write lock may have been granted and released for a grain before any read locks are requested. This is not a problem so long as the interval between the write lock being released and the read lock being requested is not so long that the grain is recycled in the meantime. This will not normally occur because all function processes are processing grains as identified by the timestamp passed to ProcessFrame, which is subject to temporal constraints as described in section 6.2.10.2 above.

Figure 6:
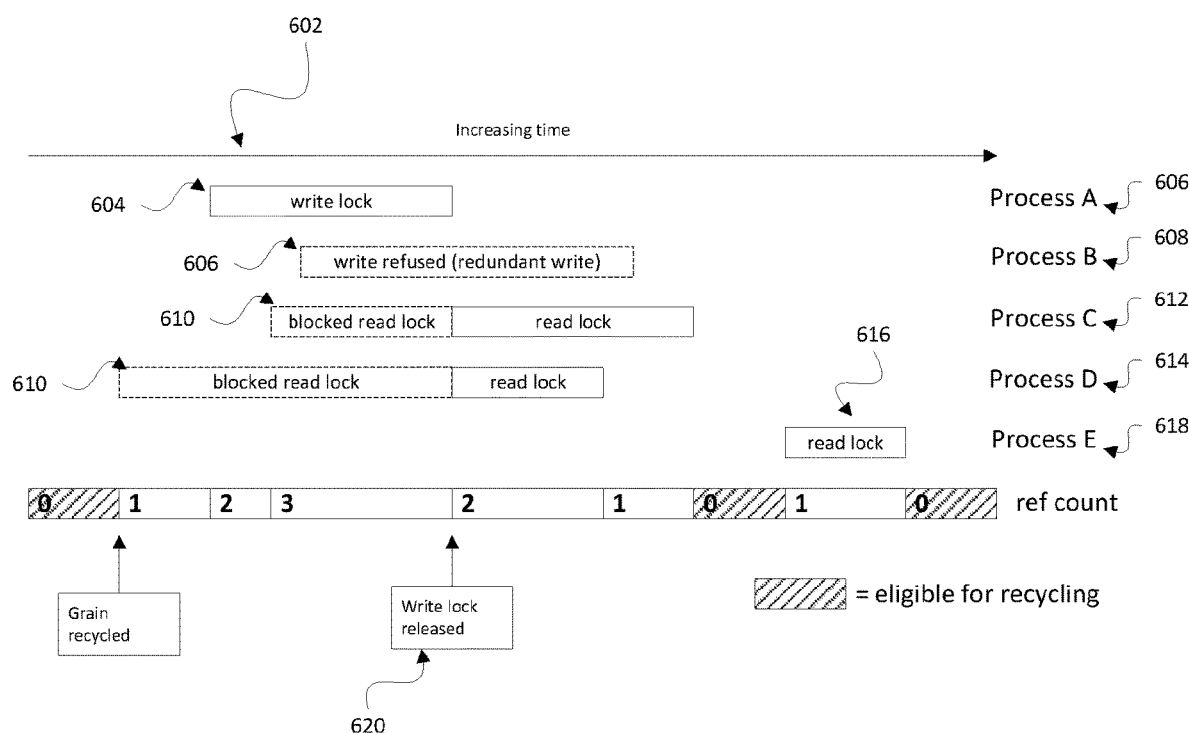
FIG. 6 shows a grain lifetime with blocked read requests in accordance with a preferred embodiment of the disclosure.

FIG. 6 illustrates a timeline [602] in which a number of processes are attempting to access a grain over an interval. Process C [612] and Process D [614] have requested read locks [610] before the grain is ready—these requests are therefore blocked until Process A [606] has obtained a write lock [604], written data (or an error code) to the grain, and released the lock [620]. Process B [608] attempts to obtain a write lock [604], but is refused because this is a redundant write. If Process A [606] were to fail sometime in the future then Process B [608] would be ready to immediately provide data for this stream; Process C [612], Process D [614], and Process E [618], the consuming processes, would be unaware of this circumstance. Since the grain data associated with a stream name and nominal timestamp is uniquely defined, it does not matter whether Function A [606] or Function B [608] is successful in obtaining the write lock from one grain to the next.

Process C [612] and Process D [614] are signalled to resume execution when Process A [606] releases its write lock [604]. When Process C [612] and Process D [614] have released their read locks, the grain becomes eligible for recycling, but since the recycling algorithm selects the oldest unreferenced frame, this is will not happen for some time—well after Process E [618] has obtained its read lock [616] and consumed data from the grain.

Figure 7:
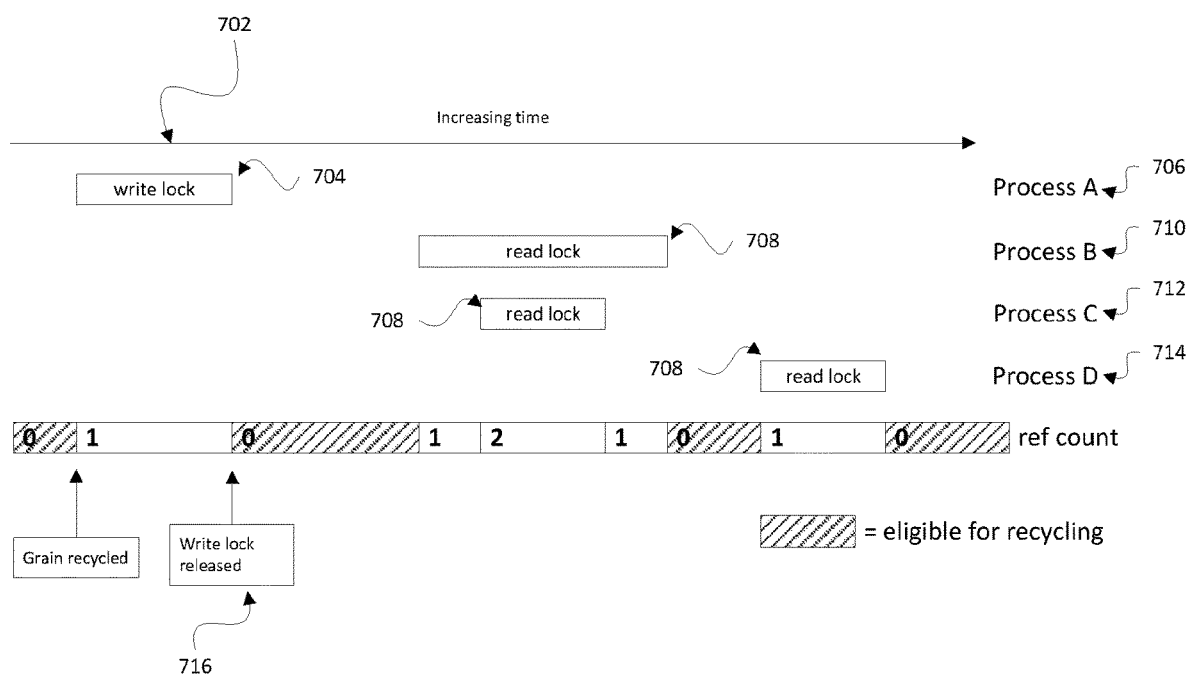
FIG. 7 shows a grain lifetime with free read requests in accordance with a preferred embodiment of the disclosure.

FIG. 7 illustrates a similar timeline [702]. In this example, Process A [706] has obtained a write lock [704] and released it [716] before any other processes have requested read locks. This is not a problem because although the grain is immediately eligible for recycling, the oldest unreferenced frame recycling algorithm will ensure that the data remains available in the pool until well after Process B [710], Process C [712], and Process D [714] have obtained read locks [708] and released them.

6.4 Multiple Host Operation of the AMF System

The operation of the AMF system across multiple hosts is a natural extension of its operation on a single host.

When a function process opens a pool on a host, this might result in the creation of a new pool. When this happens, the system-wide messaging bus is used to discover if there are any other instances of this pool on other hosts. If other instances are discovered then data transfer links are established from the new instance to all existing instances throughout the system.

This means that when a write operation is completed on any host the data written to the grain may be transmitted over these links to all other instances of the pool. Upon receiving grain data over a transfer link, the AMF Service will act as a proxy, obtaining a write lock and writing to the grain on behalf of the remote function process. This will satisfy any function processes wanting read locks for the grain.

This is the basic principle. A practical implementation requires significant additional complexity.

6.4.1 Transfer Link Maintenance

Transfer links between pools are maintained by the use of Pool Announcement messages. A pool announcement is transmitted by a host whenever a pool is created, deleted, becomes writeable, or becomes read only on that host, and may be sent at any other time in order to have existing links confirmed. The announcement is broadcast to all hosts within the system using the message bus. The message contains the name and address of the machine sending the announcement and a list of all the pools present on the sender.

Upon receiving a Pool Announcement, a host will compare its current list of pools with the list stored in the announcement message and from this analysis determine whether or not any links to remote pools need to be created or deleted.

In order to establish a link to a pool on a remote host, the AMF Service sends a CreateLink request to that host using the system message bus. The CreateLink request contains the Pool name and format. Link creation can fail because the target pool with the correct format no longer exists on the host.

If the request to create a link is granted then a link is created between the two pools. The details of how these links are established will depend on the grain transfer mechanism, as described in section 6.2.4 above, used by a particular implementation.

The transfer link maintenance mechanism may optimise the management of links by consideration of the following factors:
1. The connection between a read/only and a read/write pool instance may be unidirectional if the grain transfer mechanism in use supports this mode of operation.
2. In the case of three or more pool instances being linked multicast transfers may be used to optimise the transfer of grain data if the grain transfer mechanism in use supports this mode of operation.

Similarly, a host may use a received announcement message to determine that existing links need to deleted.

Figure 8:
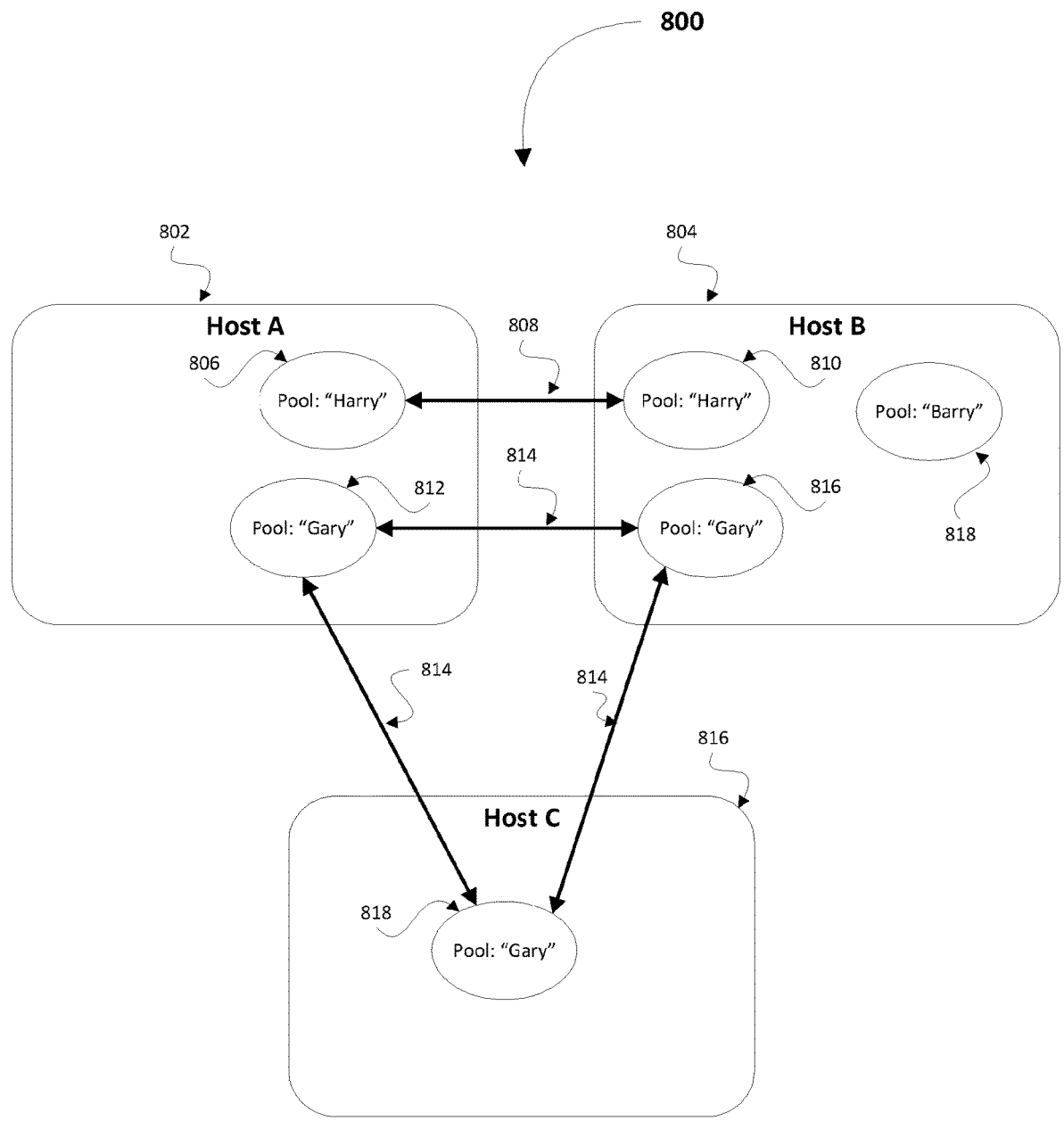
FIG. 8 is a diagram of an example of transfer links in accordance with a preferred embodiment of the disclosure.

Processing Pool Announcements will result in every pool having a link to every other pool throughout the system that has the same name and format, as shown in FIG. 8. This example illustrates an AMF system [800] containing three hosts, Host A [802], Host B [804], and Host C [816]. Pools have been created on these hosts according to the needs of the supervising application, and the transfer link maintenance mechanism has created links between instances of pools with matching name and format on each of these three hosts.

Pool "Barry" [818] exists only on Host B [804] and is not linked to any other pool.

Pool "Harry" on Host A [806] is connected to Pool "Harry" on Host B [810] with a bi-directional link [808]. Pool "Gary" on Host A [812] is connected to Pool "Gary" on Host B [816] and Pool "Gary' on Host C [818] with a set of links [814] connecting all three pools. This set of links may be optimised by the use of multicast addressing if this is supported by the underlying grain transport mechanism.

6.4.2 Processing Local Write Operations in the AMF Service

The AMF service is not directly involved in granting write locks to AMF function processes—these are obtained by the function process directly interacting with the pool via a pointer to the shared memory block within which the pool is implemented, therefore an additional mechanism is used to ensure the AMF Service is notified whenever a successful local write occurs, in order that the AMF Service can send grain data across transfer links as required. This mechanism is the write notification queue.

The Write notification queue comprises an array of integers stored in the pool's shared memory block, and a control structure stored in the pool header. The control structure has a global mutex, a pair of pointers into the queue and the write notification semaphore.

Whenever a write lock is released and new grain data is available (i.e. there has been no error code posted to the grain) the function process posts the index of the newly updated grain into the Write notification queue and increments the write notification semaphore. There is a thread in the AMF Service which is signalled whenever the value of the semaphore is non-zero. This thread retrieves the indexes of any newly written grains from the write notification thread and processes them with the remote-write algorithm.

6.4.3 Redundant Remote Writes

One of the interesting features of the AMF is the concept of "Redundant writes". It is possible for more than one AMF function process to attempt to write to a specific grain on the understanding that only one function process will successfully commit data to the pool.

In the case of a distributed system, in which grain data is transferred across network links in response to a successful write on any host it would be a waste of valuable network resource if grain data were to be transferred across a link only to be rejected as a redundant write when it arrived at the remote host. There are many scenarios where this would be likely.

Figure 9:
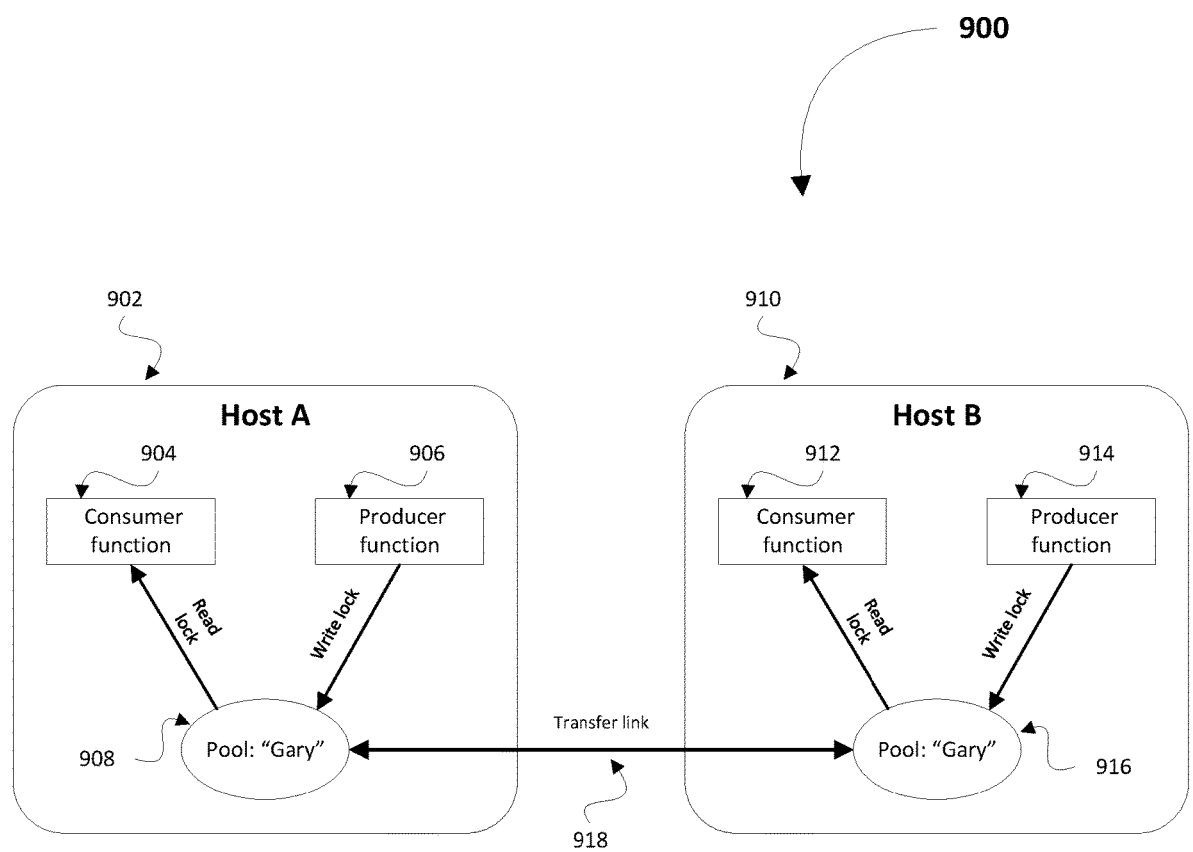
FIG. 9 is a diagram of redundant producers on different hosts in accordance with a preferred embodiment of the disclosure.

FIG. 9 illustrates an AMF system [900] includes two Hosts, Host A [902] and Host B [910].

On Host A [902], a producer function [906] writes grain data to the pool "Gary" [908]. This grain data is read by a consumer function [904].

On Host B [910], a producer function [914] writes grain data to another instance of the same pool, "Gary" [916]. This grain data is read by a consumer function [912].

If the producer function [914] on Host B were to fail, the consumer function [904] on Host A and the consumer function [912] on Host B would continue to operate normally—as the grain data produced by the producer function [906] on Host A would be transferred across the transfer link [918] to "Gary" [916] on Host B to supply the consumer function [912] on Host B.

In the case of normal operation, however, it is not necessary to transfer any grains across the link. Since the grain data produced by both the producer functions is identical, the consumer function [904] on Host A can be supplied by the Producer function on Host A [906], and the consumer function [912] on Host B can be supplied by the Producer function [914] on Host B and no grain transfer is necessary.

In a simple implementation of the multiple host AMF system, write operations for a specific grain on Pool "Gary" would be expected to occur on Host A [902] and Host B [910] at very close to the same time, since the hosts have their clocks synchronised. In this case a local write operation on both Host A and Host B would succeed at the same time. The write would be posted to the write notification queue on both hosts: the AMF service on Host A would transmit the grain data to Host B and the AMF service on Host B would transmit the grain data to Host B. In each case this would result in a redundant write on each host and wasted network bandwidth equal to twice the base bandwidth of the stream. This is a waste of valuable network resources.

6.4.4 Remote Write Cancellation

In order to avoid this problem, the AMF system uses a mechanism called "remote write cancellation", or RWC.

In order to discuss RWC it is necessary to clarify the distinction between a "local write" and a "remote write". A local write is a write operation which is completed by an AMF function process releasing a write lock on a pool to which it holds a direct pointer.

This will generate a write notification in the AMF Service, which might result in grain data being transmitted to a remote host over a transfer link. This grain data is received by the AMF Service on the remote host, and is written to the target pool—this is a "remote write" operation on the remote host.

In order to solve the problem of redundant remote writes RWC messages are used working in combination with dynamic link priority.

6.4.4.1 RWC Messages

Whenever a write operation completes on a host, whether it is a remote write or a local write, the AMF Service on the host sends out an RWC message. This message is sent via the system message bus to all other hosts within the system that hold an instance of the pool to which the message relates. A reference implementation uses a broadcast message for this purpose, but depending on the capabilities of the system message bus, another implementation may direct the message to only those hosts that have an instance of the pool. An RWC message contains the following fields:

PoolName: The name of the pool to which data has been committed

NominalTimestamp: The nominal timestamp of the committed grain

Sender: The name of the host sending the RWC message

Writer: The name of the host that provided the data that was committed

If the write that resulted in the RWC message was a local write then the Writer field will be set to the literal string "local", otherwise it will contain the name of the host that was the source of the grain data.

RWC messages are received by all running instances of the AMF Service. If the PoolName declared in the packet does not exist on the host then the packet is ignored, otherwise it is processed by the AMF Service.

6.4.4.2 Advanced Transfer Link Functions

The purpose of the RWC packet is to inform other hosts in the system that NominalTimestamp in PoolName is present on host Sender and that it is therefore not necessary to send this data to host Sender from any other host. In order to properly take advantage of this information, the transfer link requires some additional functionality. Recall that when a local write operation is completed on a grain, the grain data should be transferred across one or more transfer links to all other instances of the pool. When RWC is in operation, this transfer operation is conditional on the transfer passing through two gateway checks before being transmitted: the priority delay and the link gateway. The grain data is not to be copied from the grain until it has been confirmed that it needs to be sent out on the network, so when the write handle committing the data is closed, the AMF Service adds a reference to the grain to prevent it from becoming eligible for recycling while it is processed by the priority delay and the link gateway.

6.4.4.2.1 Priority Delay

At the sending end of each transfer link is a priority delay function. The priority delay is a property of the link that can be set to one of three possible values:

Immediate
Preferred remote delay
Backup remote delay

Preferred remote delay is typically 1 frame interval, but may be configured to any other value depending on the overall needs of the system.

Backup remote delay is typically 2 frame intervals, but may be configured to any other value greater than the setting for preferred remote delay.

If the transfer link priority delay is set to Immediate then the priority delay function is not active and any grains sent to the transfer link are immediately transmitted to the next functional block.

If the priority delay is set to preferred remote or backup remote, then the grain reference is held for the corresponding delay before being passed to the link gateway. This delay, during which the grain transfer operation is being stalled by the Priority Delay function, allows an AMF function process on another host to write to the grain on the target pool and transmit this information via an RWC packet. Should this happen, then when the RWC packet is received it is identified as being relevant to a specific link and the grain nominal timestamp contained within the packet can be added to the next functional element in the transfer link chain, the link gateway.

6.4.4.2.2 Link Gateway

When a reference to a locally originated grain has been held by the priority delay for the period specified by the current priority it is then passed to the link gateway. The link gateway is a list of grain nominal timestamps, stored in order. If the nominal timestamp of the grain being transmitted is found in the block list then the reference to the grain is released and the grain data is not transmitted across the link. If this is the case it is because while the reference was held up by the priority delay an RWC packet was received telling the host that is not necessary to transmit the grain data across the link. The Link Gateway "block list" is limited in size—whenever a new nominal timestamp is added to the list, the lowest nominal timestamp in the list is deleted.

6.4.4.2.3 Priority Adjustment

When an RWC packet is received by the host the SenderName and PoolName in the packet are used to identify the link that should be updated by the receipt of the RWC packet: it is the link from PoolName on the receiving host to PoolName on the host SenderName. Once the link is identified, the NominalTimestamp from the RWC packet is added to the Link Gateway block list.

The remaining piece of information in the RWC packet is the Writer field. This field is examined and used to adjust the link priority delay. Recall that RWC packets are sent out in response to any successful write operation—either a local or remote write. Assume that the host that has received the packet is called ReceivingHost.

There are three possibilities:

If RWC.Writer=ReceivingHost then the RWC packet was sent out in response to a write that was completed with data sent from the host that has just received the RWC packet. This means that the receiving host was successful in obtaining a write lock on the remote host, and it is therefore the host within the system best placed to provide data to the pool PoolName on SenderName. The link priority is therefore set to Immediate.

If RWC.Writer="local" then the RWC packet was sent out in response to a write that was completed by a local write operation on the remote host. This means that a local producer is available. This should be preferred in order to reduce network traffic. The link priority is therefore set to Preferred remote.

If RWC.Writer is something else—i.e., not "local" and not the name of the receiving host, then there is another host somewhere on the system that successfully obtained a write lock on the remote host. This means that this other host is in a better position to provide the data than ReceivingHost. The link priority is therefore set to Backup remote.

6.4.4.3 RWC Summary

Figure 10:
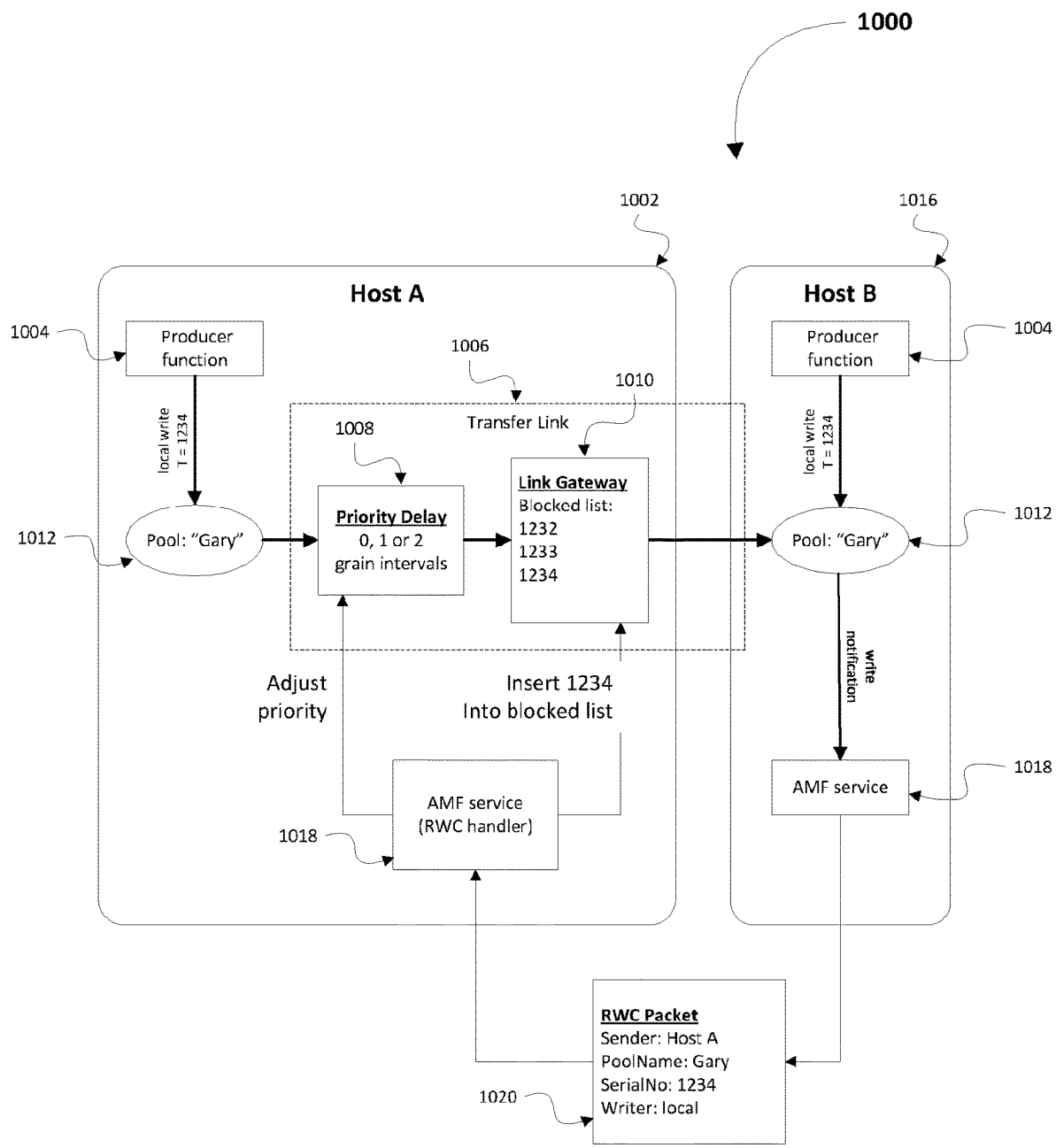
FIG. 10 is a diagram of a remote write cancellation in accordance with a preferred embodiment of the disclosure.

Referring to FIG. 10, an exemplary operation of RWC is shown. In this AMF system [1000], Host A [1002] and Host B [1016] both have an instance of the pool "Gary [1012] Each has a producer function [1004] generating grain data and copying it to the pool. Because the hosts have their system clocks synchronised, both instances of the Producer function [1004] will receive a ProcessFrame callback with the same value of Timestamp at approximately the same time.

Described is how RWC functions to inhibit the transmission of grain data from A to B, but of course exactly the same process occurs in reverse to inhibit transmission of grain data from B to A.

Producer function on Host A and Producer function on Host B both receive a ProcessFrame callback with a timestamp parameter of 1234 at approximately the same time.

On Host A [1002] Producer function writes grain data to the pool [1012]. This generates a write notification in the AMF service which (among other things) causes an RWC packet to be sent.

On Host B [1016] Producer function writes grain data to the pool [1012]. This generates a write notification in the AMF service which (among other things) causes a reference to the newly written grain to be sent to the transfer link [1006] connecting Gary on Host A to Gary on Host B. The link [1006] presently has a priority of 1 and the grain reference enters the priority delay queue [1008].

On Host A, the RWC packet is received. The SenderName and PoolName fields of the packet are examined in order to identify the link to which the packet applies. This is the link from Host A:Gary to Host B:Gary [1006]. The RWC handler within the AMF service then enters the nominal timestamp contained in the RWC packet into the blocked list of this link within the link Gateway [1010]. If the block list is full then the lowest nominal timestamp in the list is deleted to make way.

On Host A, the Priority Delay [1008] of the link from Host A:Gary to Host B:Gary is adjusted to either 0, 1 or 2 depending on the value of Writer field of the PWC packet. If Writer='local', then priority is set to 1. If Writer='Host B', then priority is set to 0. If Writer is set to anything else, then the priority is set to 2.

A similar operation occurs simultaneously in reverse to prevent grain Gary:1234 being transferred from Host A to Host B. These operations are not shown on the diagram in FIG. 10.

The Remote Write Cancellation mechanism is complex; however it is important to note that a safe failure is to send a grain that is not needed, rather than failing to send a grain that is needed. In the event of the producer function failing on host B, the RWC packet will not be sent, and so the required grain will be transmitted from Host A. It will arrive at Host B at least one grain interval later than it would otherwise have been available, but this will generally not be sufficient delay to cause an output drop. Since RWC packets are sent for all writes, whether they are remote or local, an RWC packet will be then be sent back to Host A with the Writer field set to "Host A". When this packet is received by Host A, it will (obviously) be too late to block transmission of the packet, but the Priority delay will be set to 0, thus ensuring that any AMF function processes waiting for a read lock from "Gary" will not be delayed unnecessarily.

Should the producer function be restarted on Host B, it will likely beat a remote write from Host A to the write lock on a grain—the resultant RWC packet will have Sender set to "local" and cause the link priority to be set back to 1 on Host A.

7 CLAIMS

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   at least one processor;
   a memory comprising instructions executable by the at least one processor; and
   a plurality of hosts each configured with at least one media-processing function process, respectively, together providing a plurality of media-processing function processes, each of the plurality of media-processing function processes configured to operate, under control of a media-processing application, to at least one of capture, process and/or output a media stream including a sequence of grains, where at least one of the plurality of media-processing function processes operates to at least one of capture from a real-time synchronous input stream and/or output to a real-time synchronous output stream, the plurality of hosts including at least a first host and a second host that are remote from one another, wherein the instructions when executed by the at least one processor cause the at least one processor to configure each of the plurality of hosts with an asynchronous media fabric service, each asynchronous media fabric service being configured to:
   create and delete shared memory pools, each of the shared memory pools associated with an identified media stream and used to allow the at least one media-processing function process running on the respective host direct access to the grains included in the identified media stream, with each of the grains included in the identified media stream being uniquely identified;
   create a first instance of a first shared memory pool on the first host, the first shared memory pool configured to store grains of a first media stream, wherein a producer function process included in the at least one media-processing function process running on the first host operates to produce grains that are written to the first instance of the first shared memory pool, wherein each of the grains is written in a respective local write operation;
   create a second instance of the first shared memory pool on the second host, wherein a consumer function process included in the at least one media-processing function process running on the second host operates to consume grains that are retrieved from the second instance of the first shared memory pool;
   establish a grain transfer link for a transfer of grains between the first instance of the first shared memory pool and the second instance of the first shared memory pool;
   send and receive grains from other hosts, wherein following a first local write operation of a first grain to the first instance of the first shared memory pool, the asynchronous media fabric service operating on the first host is notified by the producer function process that the first grain is available for transfer to the second instance of the first shared memory pool on the second host via the grain transfer link; and
   serve as an application programming interface endpoint for the plurality of media-processing function processes to create, delete and obtain references to media streams.

2. The system of claim 1, wherein the asynchronous media fabric service operating on the first host generates a pool announcement message to notify others of the plurality of hosts when the first instance of the first shared memory pool is created on the first host, the pool announcement message including a unique identification of the first shared memory pool.

3. The system of claim 2, wherein the grain transfer link is established between the first instance of the first shared memory pool and the second instance of the first shared memory pool following a recognition by the asynchronous media fabric service operating on the second host that the second host includes the second instance of the first shared memory pool.

4. The system of claim 1, wherein the asynchronous media fabric service operating on the first host transmits the first grain via the grain transfer link to the second host.

5. The system of claim 4, wherein the asynchronous media fabric service operating on the second host receives the first grain transmitted by the first host and writes the received first grain to the second instance of the first shared memory pool in a remote write operation; and wherein the first grain written to the second instance of the first shared memory pool in the remote write operation is retrieved and consumed by the consumer function process running on the second host.

6. The system of claim 1, wherein the first grain is a first instance of the first grain,
   wherein the producer function process running on the first host is a first producer function process,
   wherein a second producer function process included in the at least one media-processing function process running on the second host operates to produce grains that are written to the second instance of the first shared memory pool, wherein each of the grains is written in a respective local write operation, the second producer function process redundant to the first producer function process, and
   wherein the second producer function process produces a second instance of the first grain, the second instance of the first grain written to the second instance of the first shared memory pool on the second host in a second local write operation.

7. The system of claim 6, wherein the asynchronous media fabric service on the second host sends a remote write cancellation message to the first host when a grain is written to the second instance of the first shared memory pool, and
   wherein the asynchronous media fabric service on the first host processes the remote write cancellation message in advance of sending the first instance of the first grain to the second host, the processing blocking a transmission of the first instance of the first grain from the first host to the second host.

8. The system of claim 7, wherein following the first local write operation of the first instance of the first grain to the first instance of the first shared memory pool, the asynchronous media fabric service on the first host employs a priority delay function to hold the first instance of the first grain for a delay of time corresponding to a priority delay value before passing the first instance of the first grain to a link gateway for transfer over the grain transfer link to the second host, the link gateway including a block-list identifying a list of grains for which the remote write cancellation message was received from the second host.

9. The system of claim 1, wherein the grain transfer link is included in a plurality of grain transfer links, wherein the asynchronous media fabric service on each of the plurality of hosts maintains a set of grain transfer links to connect each instance of a shared memory pool on the respective host with instances of the same shared memory pool on other hosts included in the plurality of hosts, the plurality of media-processing function processes including multiple redundant producer function processes running on different hosts of the plurality of hosts, wherein each producer function process produces grains and writes them to its respective instance of the same shared memory pool, the plurality of grain transfer links configured for a transmission of grains between the instances of the same shared memory pool on different hosts included in the plurality of hosts;

when a grain is written to an instance of a shared memory pool on any host included in the plurality of hosts, sending a remote write cancellation message with the asynchronous media fabric service of the respective host to all other hosts included in the plurality of hosts having an instance of the same shared memory pool to indicate that the grain is already written on the respective host; and when the grain is written to the instance of the shared memory pool on a host included in the plurality of hosts in a local write operation, for each grain transfer link associated with the respective host, employing a priority delay function to hold the grain for a delay of time corresponding to a priority delay value of the respective grain transfer link before passing the grain to a link gateway for the respective grain transfer link, the link gateway including a block-list identifying a list of grains for which a remote write cancellation message was received from the other host associated with the respective grain transfer link and if the grain is included in the block-list, the grain is not transferred on the respective grain transfer link.

10. The system of claim 9, wherein the priority delay value is a property of the respective grain transfer link, and wherein the method further comprises adjusting the priority delay value of a grain transfer link depending on the value of a writer field of the remote write cancellation message received for the respective grain transfer link, the writer field to identify the host included in the plurality of hosts that originated the grain that was written.

11. A system comprising:

at least one processor;

a memory comprising instructions executable by the at least one processor; and a plurality of hosts each configured with at least one media-processing function process, respectively, together providing a plurality of media-processing function processes, each of the plurality of media-processing function processes configured to operate, under control of a media-processing application, to at least one of capture, process and/or output a media stream including a sequence of grains, where at least one of the plurality of media-processing function processes operates to at least one of capture from a real-time synchronous input stream and/or output to a real-time synchronous output stream, the plurality of hosts including at least a first host and a second host that are remote from one another, wherein the instructions when executed by the at least one processor cause the at least one processor to configure each of the plurality of hosts with an asynchronous media fabric service, each asynchronous media fabric service being configured to:

create and delete shared memory pools, each of the shared memory pools associated with an identified media stream and used to allow the at least one media-processing function process running on the respective host direct access to the grains included in the identified media stream, with each of the grains included in the identified media stream being uniquely identified;

create a first instance of a first shared memory pool on the first host, the first shared memory pool configured to store grains of a first media stream, wherein a producer function process included in the at least one media-processing function process running on the first host operates to produce grains that are written to the first instance of the first shared memory pool, wherein each of the grains is written in a respective local write operation;

create a second instance of the first shared memory pool on the second host, wherein a consumer function process included in the at least one media-processing function process running on the second host operates to consume grains that are retrieved from the second instance of the first shared memory pool;

establish a grain transfer link for a transfer of grains between the first instance of the first shared memory pool and the second instance of the first shared memory pool; and send and receive grains from other hosts, wherein following a first local write operation of a first grain to the first instance of the first shared memory pool, the asynchronous media fabric service operating on the first host is notified by the producer function process that the first grain is available for transfer to the second instance of the first shared memory pool on the second host via the grain transfer link.

12. The system of claim 11, wherein the asynchronous media fabric service operating on the first host generates a pool announcement message to notify others of the plurality of hosts when the first instance of the first shared memory pool is created on the first host, the pool announcement message including a unique identification of the first shared memory pool.

13. The system of claim 12, wherein the grain transfer link is established between the first instance of the first shared memory pool and the second instance of the first shared memory pool following a recognition by the asynchronous media fabric service operating on the second host that the second host includes the second instance of the first shared memory pool.

14. The system of claim 11, wherein the asynchronous media fabric service operating on the first host transmits the first grain via the grain transfer link to the second host.

15. The system of claim 14, wherein the asynchronous media fabric service operating on the second host receives the first grain transmitted by the first host and writes the received first grain to the second instance of the first shared memory pool in a remote write operation; and wherein the first grain written to the second instance of the first shared memory pool in the remote write operation is retrieved and consumed by the consumer function process running on the second host.

16. The system of claim 11, wherein the first grain is a first instance of the first grain,
    wherein the producer function process running on the first host is a first producer function process,
    wherein a second producer function process included in the at least one media-processing function process running on the second host operates to produce grains that are written to the second instance of the first shared memory pool, wherein each of the grains is written in a respective local write operation, the second producer function process redundant to the first producer function process, and
    wherein the second producer function process produces a second instance of the first grain, the second instance of the first grain written to the second instance of the first shared memory pool on the second host in a second local write operation.

17. The system of claim 16, wherein the asynchronous media fabric service on the second host sends a remote write cancellation message to the first host when a grain is written to the second instance of the first shared memory pool, and
    wherein the asynchronous media fabric service on the first host processes the remote write cancellation message in advance of sending the first instance of the first grain to the second host, the processing blocking a transmission of the first instance of the first grain from the first host to the second host.

18. The system of claim 17, wherein following the first local write operation of the first instance of the first grain to the first instance of the first shared memory pool, the asynchronous media fabric service on the first host employs a priority delay function to hold the first instance of the first grain for a delay of time corresponding to a priority delay value before passing the first instance of the first grain to a link gateway for transfer over the grain transfer link to the second host, the link gateway including a block-list identifying a list of grains for which the remote write cancellation message was received from the second host.

19. The system of claim 11, wherein the grain transfer link is included in a plurality of grain transfer links,
    wherein the asynchronous media fabric service on each of the plurality of hosts maintains a set of grain transfer links to connect each instance of a shared memory pool on the respective host with instances of the same shared memory pool on other hosts included in the plurality of hosts, the plurality of media-processing function processes including multiple redundant producer function processes running on different hosts of the plurality of hosts, wherein each producer function process produces grains and writes them to its respective instance of the same shared memory pool, the plurality of grain transfer links configured for a transmission of grains between the instances of the same shared memory pool on different hosts included in the plurality of hosts;
    when a grain is written to an instance of a shared memory pool on any host included in the plurality of hosts, sending a remote write cancellation message with the asynchronous media fabric service of the respective host to all other hosts included in the plurality of hosts having an instance of the same shared memory pool to indicate that the grain is already written on the respective host; and
    when the grain is written to the instance of the shared memory pool on a host included in the plurality of hosts in a local write operation, for each grain transfer link associated with the respective host, employing a priority delay function to hold the grain for a delay of time corresponding to a priority delay value of the respective grain transfer link before passing the grain to a link gateway for the respective grain transfer link, the link gateway including a block-list identifying a list of grains for which a remote write cancellation message was received from the other host associated with the respective grain transfer link and if the grain is included in the block-list, the grain is not transferred on the respective grain transfer link.

20. The system of claim 19, wherein the priority delay value is a property of the respective grain transfer link, and
    wherein the method further comprises adjusting the priority delay value of a grain transfer link depending on the value of a writer field of the remote write cancellation message received for the respective grain transfer link, the writer field to identify the host included in the plurality of hosts that originated the grain that was written.

* * * * *